Patented Sept. 13, 1949

2,481,583

UNITED STATES PATENT OFFICE 2,481,583

CONDENSATION OF OLEFINIC COMPOUNDS WITH HYDROGEN SULFIDE

John B. Fenn, Riverview, and John L. Eaton, Trenton, Mich., assignors to Sharples Chemicals Inc., Philadelphia, Pa., a corporation of Delaware No Drawing. Application December 30, 1943, Serial No. 516,245

8 Claims. (Cl. 260—609)

1

The present invention pertains to the manufacture of mercaptans by condensation of hydrogen sulfide with tertiary olefinic compounds. It is an improvement in the process of the prior application of John F. Olin, Serial No. 459,025, filed September 19, 1942, now abandoned, and it is a specific improvement of the process of the application of John F. Olin and John L. Eaton, Serial No. 472,946, filed January 20, 1943, now Patent 2,434,510, granted January 13, 1948.

The invention may be practiced in condensation of hydrogen sulfide with various tertiary olefinic compounds, including open chain tertiary olefins, and tertiary olefins substituted by aromatic, alicyclic or heterocyclic radicals. In fact, the invention is applicable to all tertiary olefinic compounds capable of undergoing addition reactions of this type. It was developed, however, in connection with attempts to improve the economic conditions involved in condensation of open chain tertiary olefins with hydrogen sulfide, and will accordingly be described, for purposes of illustration, as a process of making open chain tertiary aliphatic mercaptans by such a process.

In the manufacture of tertiary mercaptans by catalytic reaction between hydrogen sulfide and a tertiary olefin, the desirable condensation reaction is reversible. As a consequence of this reversibility, the degree of conversion attainable is limited by the concentration of reactants as well as the activity of the catalyst. Catalysts employed to promote this reaction also promote polymerization and depolymerization of the tertiary olefin under treatment. The conversion of a part of the tertiary olefin to be condensed with hydrogen sulfide into a lower olefin decreases the yield for at least two reasons. In the first place, polymerization or depolymerization involves conversion of the tertiary olefin of the carbon content desired into an olefin which cannot be condensed with the hydrogen sulfide to produce the desired tertiary mercaptan. Secondly, the olefin resulting from polymerization or depolymerization condenses with hydrogen sulfide to produce a considerable quantity of mercaptan of carbon content other than that desired. This results in loss of effective use of both tertiary olefinic material and hydrogen sulfide in practice of the process, and also causes a chemical equilibrium to be established at a point at which a smaller proportion of the desired tertiary mercaptan has been formed than would be the case if the polymerization and depolymerization reactions could be eliminated during condensation of the tertiary olefin with hydrogen sulfide.

2

A feature of the present invention consists in the fact that it involves practice of a condensation reaction of this type with the aid of a combination of catalysts capable of promoting rapid performance of the desired condensation reaction while reducing the degree of polymerization or depolymerization, as compared to prior art catalysts.

The primary catalyst of the present invention, like that of the above-mentioned Olin and Eaton application in the preferred embodiment thereof, is boron fluoride. As in the practice of that application, we effect condensation of hydrogen sulfide with tertiary olefins in the practice of the present invention at temperatures much lower than those which have theretofore been successfully used in condensation of olefins with hydrogen sulfide. In the practice of the present invention, temperatures below —45° C. and even as low as —60° C. may be used.

Experimentation with the process of the above-mentioned application of Olin and Eaton, Serial No. 472,946, has proved that results are attained in practice of the process of that application which are amazingly better from the standpoint of yield and conversion than results obtained from condensation of comparable olefins with hydrogen sulfide under any other reaction conditions. In the interest of economy, it is desirable that the amount of boron fluoride catalyst used be as small as is consistent with attainment of the desired yields and conversions, and it is also desirable that the molecular excess of hydrogen sulfide used in the reaction be maintained relatively small; e. g., at a ratio which may be as low as 2:1 or even lower. When very small amounts of boron fluoride are used and when a molar ratio of hydrogen sulfide to olefin of the general order of 2:1 is used instead of using a molar ratio of 10 or 12:1 as in certain prior experiments, however, it has been found that the reaction is relatively slow, and sometimes that the conversions to the desired mercaptan within a reasonable time are much smaller than anticipated.

The temperatures used in practice of this process may vary with the particular tertiary olefin under treatment. Temperatures which are lower than —40° C. have been found to be best for manufacture of tertiary mercaptans from branched chain olefins containing between 8 and 20 carbon atoms, such as tri-isobutylene. Regardless of the particular tertiary olefin to be condensed with hydrogen sulfide, however, the practice of the present invention, which consists in use of at least a small amount of hydrogen fluoride with the boron fluoride catalyst, results in a substantial improvement in the rate of reaction and in rapid conversion to the desired mercaptan even in cases in which the temperature is maintained sufficiently low to afford a high equilibrium constant and the ratio of hydrogen sulfide to tertiary olefin and ratio of catalyst to reactants is maintained sufficiently low to obtain optimum economy of operation.

It is recommended that a temperature below 0° C. be used in conduct of the reaction in manufacture of all tertiary mercaptans, regardless of whether the tertiary olefin under treatment is isobutylene or an olefin of very high molecular weight, such as a high molecular weight polymer of a lower olefin. Temperatures below —40° C. have beeen found to give best results as to conversion and yield in cases in which tertiary mercaptans containing between 8 and 20 carbon atoms are produced from branched chain olefins of corresponding carbon content.

It is desirable not only that the reaction be conducted at a relatively low temperature, but also that the boron fluoride-hydrogen fluoride catalyst be quenched by addition of water, an anti-freeze solution, steam or other quenching agent capable of rendering the catalyst inactive, the temperature being also relatively low at the time of performance of the quenching operation. This feature of quenching the catalyst is covered in our co-pending application Serial No. 516,244, filed December 30, 1943, now Patent No. 2,468,739.

The invention pertains to manufacture of tertiary mercaptans. As noted, temperatures below 0° C. are desirable both in the reacting and quenching steps in manufacture of such mercaptans.

*Example I*

Hydrogen sulfide at a rate of 19 lb. per hour and tri-isobutylene containing 0.15% of anhydrous hydrogen fluoride, at a rate of 43 lb. per hour were pumped concurrently through a reactor tube, cooled to a temperature of —61° C. by means of a solid carbon dioxide-alcohol bath, for a period of seven hours. At a point in the reactor tube, after which a sojourn time of about 3 minutes obtained, boron trifluoride was continuously introduced in an amount equivalent to about 1.6% by weight of the total reaction mixture. Immediately upon leaving the cooled portion of the reactor tube, live steam was intimately mixed with the effluent in such a manner as to drive off all the unreacted hydrogen sulfide and to leave the product at a temperature of about 40° C. By means of a decanting device the steam condensate was separated from the crude product which was in turn washed with dilute sodium hydroxide and filtered. There were thus obtained 335 lb. of a clear, light yellow material containing 83% of the corresponding dodecyl mercaptan.

*Example II*

400 grams of tri-isobutylene and 200 grams of hydrogen sulfide are placed in a glass flask immersed in a bath cooled with solid carbon dioxide to —60° C. Between five and ten grams of liquid hydrogen fluoride are then introduced and a slow stream of boron trifluoride is bubbled through the mixture. Reaction occurs within a few minutes, as is evidenced by a rise in temperature to the boiling point of the mixture and vigorous ebullition of hydrogen sulfide. 200 grams of a mixture of methanol and water, previously cooled to —60° C., are then poured into the reaction flask with vigorous stirring. After three to five minutes the flask is removed from the bath and gently warmed to drive off the unreacted hydrogen sulfide. The product is decanted from the methanol-water mixture and washed with dilute sodium hydroxide solution and water. A material, practically water white, having a specific gravity of from 0.858 to 0.860 @ 20° C. and containing 90 to 95 per cent of tertiary dodecyl mercaptan is obtained.

Various modifications are possible within the scope of the invention, and we do not therefore wish to be limited except by the scope of the following claims.

We claim:

1. In the manufacture of mercaptans, the process comprising condensing an aliphatic tertiary olefinic hydrocarbon with hydrogen sulfide by contacting said olefinic compound with said hydrogen sulfide in fluid state in the presence of boron fluoride and hydrogen fluoride at a temperature below 0° C.

2. In the manufacture of mercaptans, the process comprising condensing an aliphatic tertiary olefinic hydrocarbon having between 8 and 20 carbon atoms with hydrogen sulfide by contacting said olefinic compound with said hydrogen sulfide in fluid state in the presence of boron fluoride and hydrogen fluoride at a temperature below —40° C. to form a mercaptan by addition of the hydrogen sulfide to the olefinic hydrocarbon, said aliphatic tertiary olefinic hydrocarbon being a polymer of an aliphatic olefinic hydrocarbon of a lesser number of carbon atoms.

3. In the manufacture of mercaptans, the process comprising condensing an aliphatic tertiary olefinic hydrocarbon having between 8 and 20 carbon atoms with hydrogen sulfide by contacting said olefinic compound with said hydrogen sulfide in fluid state in the presence of boron fluoride and hydrogen fluoride at a temperature below 0° C. to form a mercaptan by addition of the hydrogen sulfide to the olefinic hydrocarbon, said aliphatic tertiary olefinic hydrocarbon being a polymer of an aliphatic olefinic hydrocarbon of a lesser number of carbon atoms.

4. In the manufacture of tertiary dodecyl mercaptan, the process comprising condensing tri-isobutylene with hydrogen sulfide by contacting said tri-isobutylene with said hydrogen sulfide in fluid state in the presence of boron fluoride and hydrogen fluoride at a temperature below 0° C.

5. In the manufacture of tertiary dodecyl mercaptan, the process comprising condensing tri-isobutylene with hydrogen sulfide by contacting said tri-isobutylene with said hydrogen sulfide in fluid state in the presence of boron fluoride and hydrogen fluoride at a temperature below —40° C.

6. In the manufacture of mercaptans, the process comprising condensing a tertiary olefinic hydrocarbon with hydrogen sulfide by contacting said olefinic hydrocarbon wtih said hydrogen sulfide in fluid state in the presence of boron fluoride and hydrogen fluoride at a temperature below 0° C.

7. In the manufacture of mercaptans, the process comprising condensing a tertiary olefinic hydrocarbon having between 8 and 20 carbon atoms with hydrogen sulfide by contacting said olefinic hydrocarbon with said hydrogen sulfide in fluid state in the presence of boron fluoride and hydrogen fluoride at a temperature below —40° C. to form a mercaptan by addition of the hydrogen sulfide to the olefinic hydrocarbon.

8. A method for preparing mercaptans, comprising reacting tri-isobutylene with hydrogen sulfide at a temperature below 0° C. in the presence of boron fluoride and hydrogen fluoride while maintaining in the reaction zone a stoichiometric excess of hydrogen sulfide oved tri-isobutylene.

JOHN B. FENN.
JOHN L. EATON.

REFERENCES CITED

The following references are of record in the file of this patent:

UNITED STATES PATENTS

| Number | Name | Date |
|---|---|---|
| 1,836,170 | Johansen | Dec. 15, 1931 |
| 1,836,183 | Nisson | Dec. 15, 1931 |
| 2,051,806 | Allen | Aug. 25, 1936 |
| 2,052,268 | Williams | Aug. 25, 1936 |
| 2,101,096 | Reuter | Dec. 7, 1937 |
| 2,173,482 | Keunecke | Sept. 19, 1939 |
| 2,352,435 | Hoefelman | June 27, 1944 |
| 2,366,453 | Meadow | Jan. 2, 1945 |